Sept. 13, 1932.　　　G. E. SHOWERS　　　1,877,699
ATTACHMENT FOR TOOLS
Filed March 16, 1931　　　3 Sheets-Sheet 1

WITNESSES
Edw. Thorpe

INVENTOR
George E. Showers
BY
ATTORNEY

Sept. 13, 1932.  G. E. SHOWERS  1,877,699
ATTACHMENT FOR TOOLS
Filed March 16, 1931   3 Sheets-Sheet 2
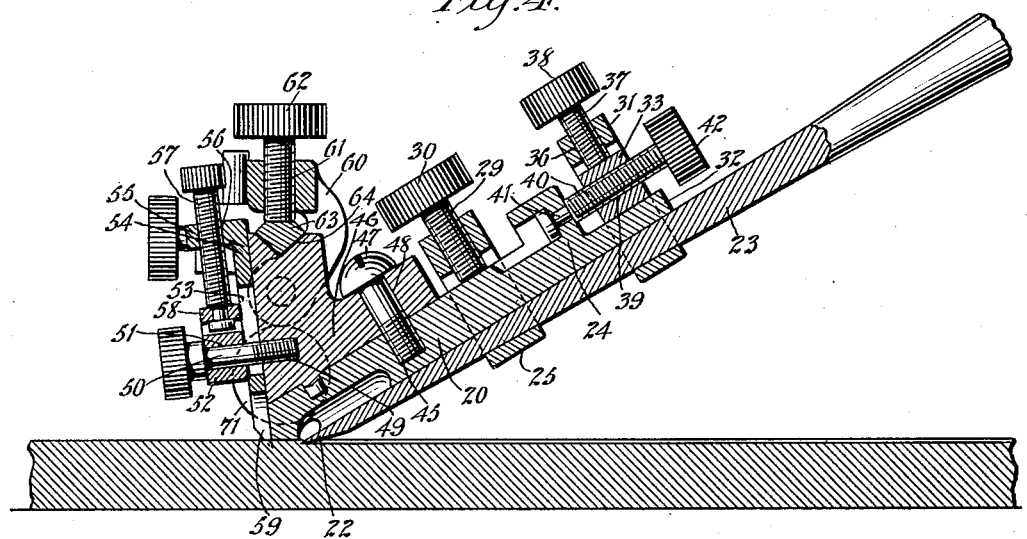
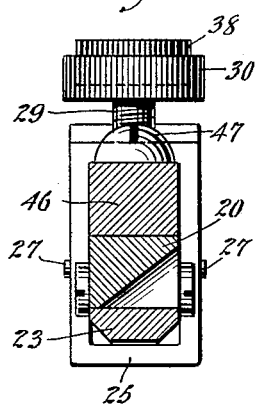 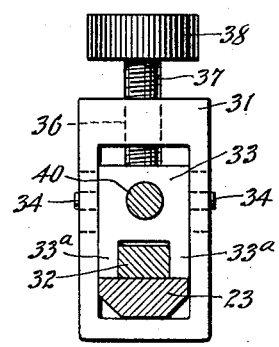 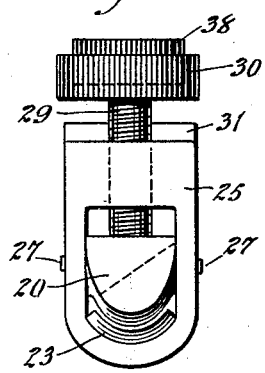
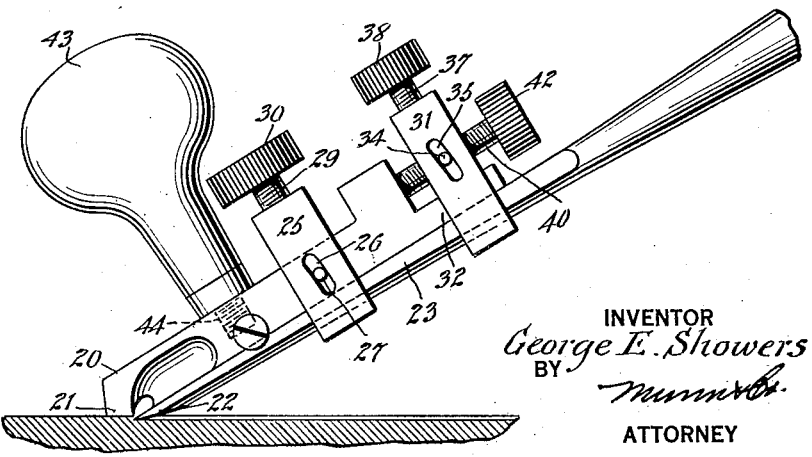
WITNESSES
INVENTOR
George E. Showers
BY
ATTORNEY Sept. 13, 1932.   G. E. SHOWERS   1,877,699
ATTACHMENT FOR TOOLS
Filed March 16, 1931   3 Sheets-Sheet 3
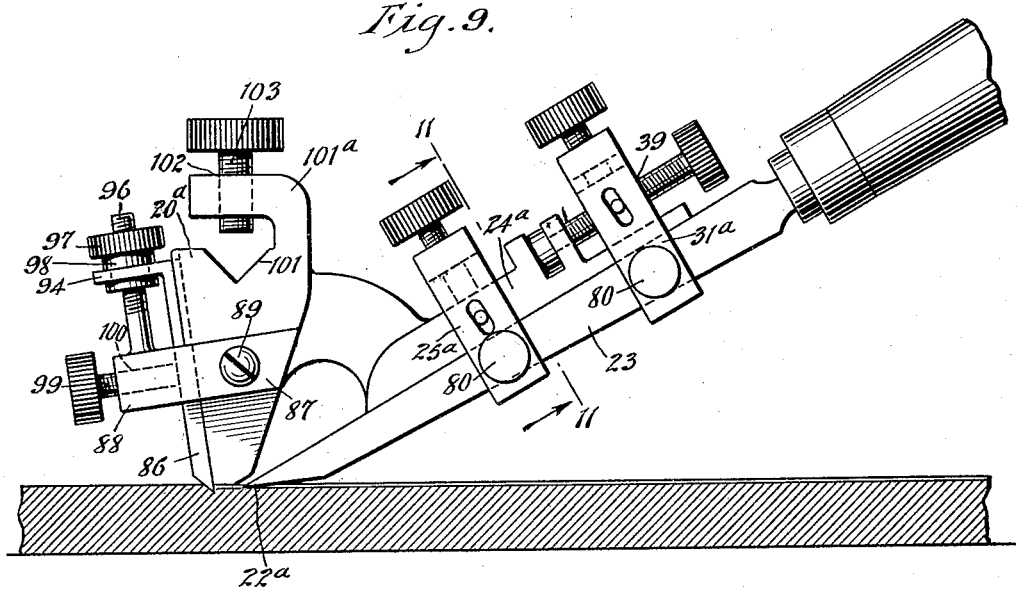
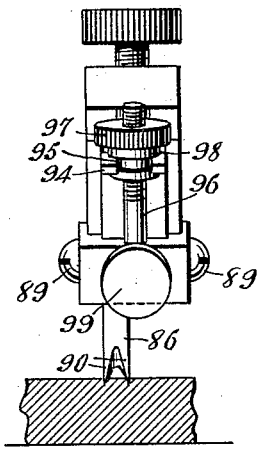 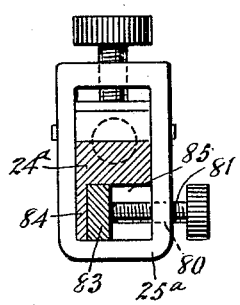 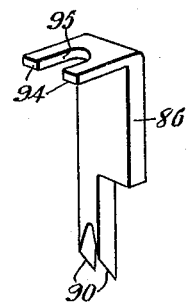 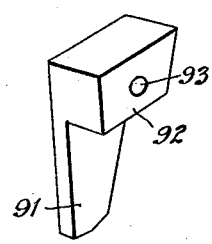
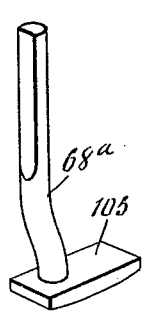 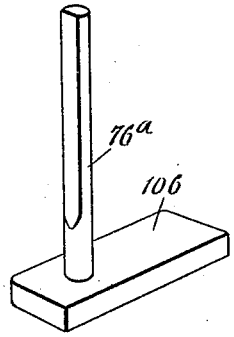
WITNESSES
Edw Thorpe
INVENTOR
G. E. Showers
BY Munn & Co.
ATTORNEY Patented Sept. 13, 1932

1,877,699

UNITED STATES PATENT OFFICE

GEORGE E. SHOWERS, OF BROOKLYN, NEW YORK

ATTACHMENT FOR TOOLS

Application filed March 16, 1931. Serial No. 523,110.

An object of the invention is to provide an attachment for tools and particularly chisels, which has a guide member disposed above and in advance of the cutting edge of the chisel to regulate the cut to be made by the chisel.

Another object of the invention is to provide means mounted on the shank of the chisel for adjusting the position of the guide member relatively to the cutting edge. Preferably the guide member has a rear extension with a sleeve through which the shank of the chisel extends and there is another sleeve disposed around the shank of the chisel, the second sleeve having means for securing it to the shank of the chisel and means for moving the guide member and the first mentioned sleeve relatively to the second mentioned sleeve for adjusting the guide member relatively to the chisel. Additional means may be provided for securing the first mentioned sleeve relatively to the chisel.

Still another object of the invention is to adjustably mount a side cutter on the guide member.

A further object of the invention is to provide the guide member with a depth guide to regulate the depth of the sum of the several cuts made by the chisel, and a lateral guide which will serve to hold the chisel laterally at a desired position.

The invention furthermore has as an object to provide adjustable means on the attachment for accommodating chisels and side cutters of different widths.

Additional objects of the invention will appear in the following specification in which the preferred form of the invention is described.

Figure 1:
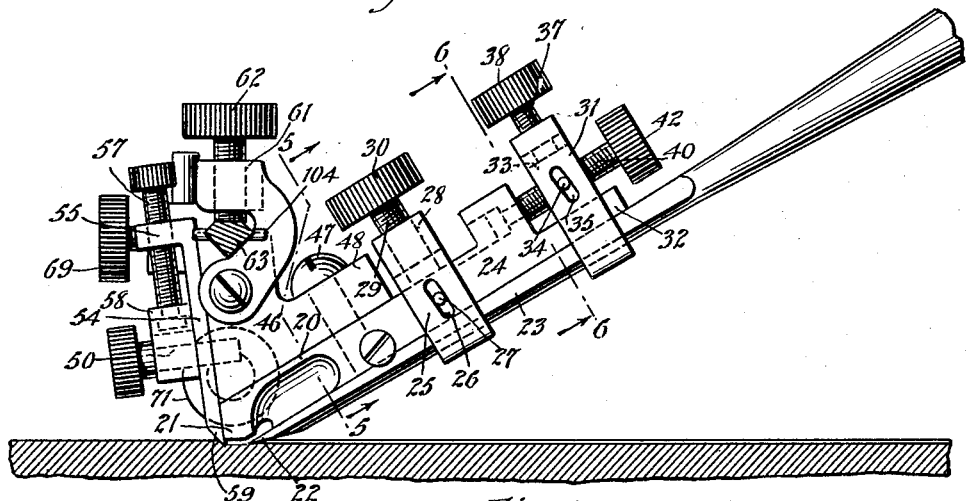
Figure 2:
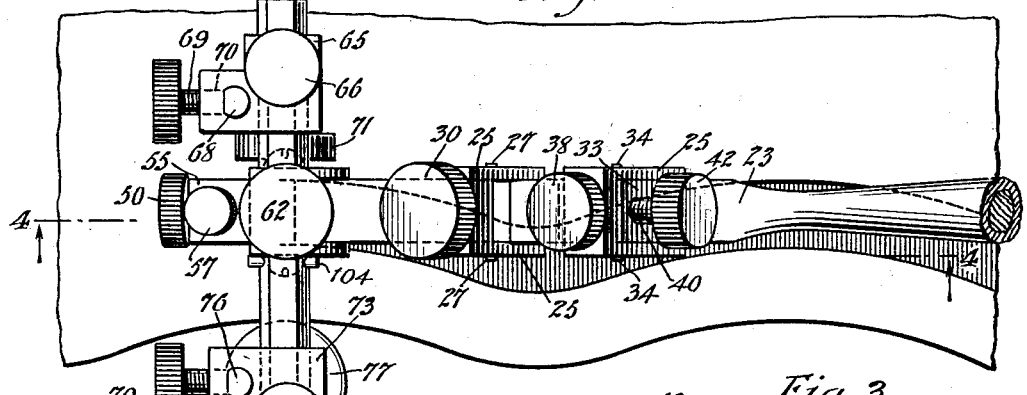
Figure 3:
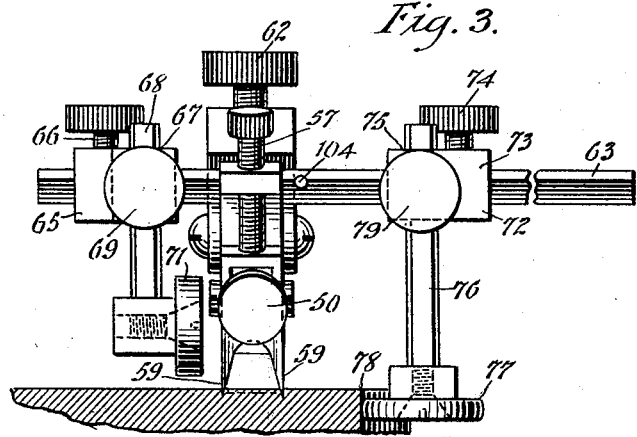

In the drawings similar reference characters refer to similar parts in all the views, of which Figure 1 is a side sectional elevation of the invention, Figure 2 is a plan view of Figure 1, Figure 3 is a front elevation of the invention, Figure 4 is a sectional view on the line 4—4 of Figure 2, Figure 5 is an enlarged sectional view on the line 5—5 of Figure 1, Figure 6 is an enlarged sectional view on the line 6—6 of Figure 1, Figure 7 is a sectional view similar to the sectional view illustrated in Figure 6, but showing the parts for use in connection with a gauge, Figure 8 is a side elevation showing the invention with the side cutters removed and a hand piece substituted therefor, Figure 9 is a side elevation of a modified form of the invention, Figure 10 is a front view of Figure 9, Figure 11 is a sectional view on the line 11—11 of Figure 9, Figure 12 is a perspective view illustrating a side cutter used in the modified form of the invention illustrated in Figure 9, Figure 13 is a perspective view illustrating a guide member extension used in the modified form of the invention, Figure 14 is a perspective view illustrating a modified form of depth guide for the sum of the cuts to be made by the chisel, and Figure 15 is a view illustrating a modified form of the lateral guide.

By referring to the drawings it will be seen that a guide member 20 is provided which has a portion 21 normally disposed at the front and above the cutting edge 22 of the chisel or tool, this chisel or tool having a shank 23 and the guide member 20 being provided with a rearwardly extending portion 24 on which is mounted a sleeve 25 with vertical slots 26 in which extend pins 27 which are secured to the rearwardly extending portion 24 of the guide member 20. There is a threaded opening 28 in the sleeve 25 and movable in this threaded opening 28 there is a screw 29 which, by means of the finger piece 30, may serve to press downwardly the rearwardly extending portion 24 of the guide member 20 to press the rearwardly extending portion 24 against the shank 23 of the chisel or tool. Another sleeve 31 is provided, this sleeve 31 being disposed around a portion 32 of the rearwardly extending portion 24 of the guide member 20 and also preferably extending around the bottom of the shank 23 of the chisel or other tool. In this sleeve 31 there is a bearing block 33 having pins 34 which extend in vertical slots 35 in the sleeve 31. It will, therefore, be seen that the bearing block 33 is held within the sleeve 31, although it may move upwardly or downwardly relatively thereto.

In the sleeve 31 there is a threaded opening 36 in which a screw 37 meshes, the screw 37 having a finger piece 38 by which it may be turned, the screw 37 being provided for pressing against the upper portion of the bearing member 33 to press the sides 33$^a$ of the said bearing member downwardly against the shank 23 of the tool, there being an opening between the said sides 33$^a$ through which the rearwardly extending portion 32 of the guide member is disposed. In the bearing member 33 there is a threaded opening 39 in which a screw 40 meshes, the screw 40 being secured in a bearing 41 in the portion 24 of the guide member 20 so that, with the rotation of the screw 40 by means of its finger piece 42 and with the sleeve 31 secured to the shank 23 of the tool, the bearing member 20 may be moved forwardly or rearwardly relatively to the tool's cutting edge 22.

It will be understood that a rough adjustment of the attachment may be made, when the sleeve 31 may be secured to the shank 23 of the tool by turning the screw 37 and when this has been done the screw 40 may be turned by its finger-piece 42 to further adjust the guide member 20 relatively to the cutting edge of the tool. When this adjustment has been made, the screw 29 may be turned, if desired, to secure the sleeve 25 to the shank 23 of the tool. A handle 43 having a screw 44 may be secured in a threaded opening 45 in the guide member 20 to assist in the operation of the chisel, it being understood that the guide member 20 at its portion 21 will be disposed above and in advance of the cutting edge 22 of the tool, as best shown in Figure 8 of the drawings, to regulate the depth of each cut made by the cutting edge 22. It will further be seen that the underside of the cutting edge 22 is uncovered and the depth of each cut made by the cutting edge 22 will be regulated solely by the portion 21 of the guide member 22 and that by the adjustment of the guide member relatively to the cutting edge 22, the depth of each cut made by the cutting edge may be regulated.

When desired the handle 43 may be removed from the guide member 20 and a support 46 may be mounted on the guide member 20 and a screw 47 may be used to extend through an opening 48 in the support and in the threaded opening 45 in the guide member 20 to secure the support 46 in position. This support 46 has a threaded opening 49 in which normally meshes a screw 50, this screw 50 extending through an opening 51 in a bearing member 52 and also in a slot 53 in a side cutter 54. The side cutter 54 has a forwardly extending flange 55 with a threaded opening 56 in which meshes a screw 57, the screw 57 being secured in a bearing 58 in the bearing member 52. It will, therefore, be understood that when the screw 50 is turned a little to free the bearing member 52 from the support 46, the screw 57 may be turned to move the side cutter 54 upwardly or downwardly for purposes of adjustment and when this adjustment has been obtained the screw 50 may be turned home to hold the side cutter in adjusted position. The side cutter 54, as best illustrated in Figure 3, has two cutting edges 59 which are disposed in alignment with the sides of the cutting edge 22 in a manner readily understood.

Pivoted to the support 46 there is a bearing member 60 having a threaded opening 61 in which a screw 62 meshes, it being possible to move the bearing member 60 rearwardly and dispose a guide bar 63 at a bearing portion 64 of the support 46 and, when this has been done, to move the bearing member 60 forwardly to the position illustrated in Figure 4, when the screw may be turned home against a flat surface of the guide bar 63 to hold the guide bar 63 relatively to the support 46.

Any desired guide members may be mounted on this guide bar 63. As illustrated in Figures 2 and 3, preferably on the guide bar 63 at one side of the support 46 there is mounted a block 65 which has an opening in which the guide bar 63 is disposed, so that the block 64 may slide on the guide bar, a screw 66 meshing in a threaded opening in the block 65 for engaging the guide bar 63 for holding the block in adjusted position.

There is also another bearing 67 in the block 65 through which an arm 68 extends, the arm 68 being held in position by a screw 69 which meshes in a threaded opening 70 in the block for engaging the arm 68 to hold the arm 68 in adjusted position. Mounted for rotating on the arm 68 there is a guide wheel 71 which acts as a depth guide to regulate the sum of the cuts which are made by the cutting edge 22 and the side cutter 54 so that the total number of cuts made by the cutting edge 22 and the side cutter 54 will not cut the material below a certain point.

Preferably at the other side of the guide bar 63 there is mounted a block 72 which has an opening 73 through which the guide bar 63 is disposed, there being a screw 74 similar to the screw 66 for holding the block 72 in adjusted position on the guide bar. The block 72 has a bearing 75 through which an arm 76 extends, there being mounted on the arm 76 a guide roller 77 for engaging an edge 78 of the material to regulate the distance of the cutting edge 22 and the side cutter 69 from the said edge 78 of the material. The arm 76 is held in adjusted position by means of the screw 79 which corresponds with the screw 69.

It will be seen from the above that not only is it possible to regulate the depth of each cut made by the cutting edge of the chisel or other tool, but it is also possible to regulate, by means of the guide wheel 71, the depth of the several cuts made by the cutting edge 22 and the cutter 54, so that the cut made in the material will not be beyond a certain depth. It is also possible to regulate the distance of the cut made from a side edge 78 of the material.

In the modified form of the invention illustrated in Figure 9, provision is made for using chisels of different widths, a sleeve 25$^a$ being mounted on the extending portion 24$^a$ of the guide member 20 in the manner stated with reference to the form of the invention illustrated in Figure 1 of the drawings, but this sleeve 25$^a$ and also the sleeve 31$^a$ are each provided with a threaded opening 80 in which a screw 81 meshes, the screw 81 serving to engage a side of the shank 83 of the tool to hold the shank against a side 84 of the extending portion 24$^a$ at an opening 85 in the said rearwardly extending portion 24$^a$ of the guide member 20. The said rearwardly extending portion 24$^a$ of the guide member 20 is adjusted and is secured to the shank 23 of the tool in the manner which has already been described.

A special form of side cutter is used in this form of the invention, this side cutter being illustrated in Figure 12 of the drawings and having a body portion 86 which fills the space between the arms 87 of a bearing member 88 which is secured to the sides of the guide member 20$^a$ by screws 89, the cutting edges 90 being spaced apart at one side of the said body portion 86 of the said side cutter to correspond with the width of the cutting edge 22$^a$ of the cutting member. The forwardly extending edge of the guide member corresponds in width with the cutting edge 22$^a$ and with the cutting points 90 of the side cutter and, therefore, when desired, a member 91 is provided which has an extending portion 92 which will fill the space between the arms 87 of the bearing member 88 so that the screws 89 may be used to secure the said arms 87 of the bearing member 88 to the guide member 20$^a$, the said screws 89 also passing through the opening 93 in the extending portion 92 of the member 91, the said member 91 acting with the portion 21 of the guide member 20$^a$ to obtain the desired width of the guide member 20$^a$, which should correspond with the width of the cutting edge 22$^a$ and the distance between the cutting points 90 of the side cutter 86.

The side cutter 86 has a forwardly extending flange 94 with a slot 95, a screw 96 being secured to the bearing member 88 and being engaged by a nut 97 having a bearing 98 in which the flange 94 at the sides of its slot 95 is disposed. It will, therefore, be seen that by turning the nut 97 the side cutter 86 may be raised or lowered as desired, it being possible, by means of the screw 99 which meshes in a threaded opening 100 in the bearing member 88, to press the side cutter 86 against the guide member 20$^a$ to hold the side cutter 86 in adjusted position. The guide member 20$^a$ has a bearing 101 in which the bar 63 may be disposed, there being a flange 101$^a$ extending from the guide member 20, the flange 101$^a$ having a threaded orifice 102 in which a screw 103 meshes, the screw 103 being provided to press against the guide bar 63 to hold the guide bar in position.

It will be seen, by referring to Figure 2 of the drawings, that the guide bar 63 is preferably provided with a boss 104 which may be disposed against the side of the support 46, or against the side of the guide member 20$^a$, which will permit of the adjustment of the guide wheels 71 and 77 when the tool is to be moved in one direction and, if it should be desired to move the tool in the opposite direction because of the grain of the wood, the guide may be reversed so that the cut may be continued relatively to the side 78 of the material which is being cut without making any adjustments.

In some cases it is desirous of using a depth cutter without the guide wheel 71 and in Figure 14 there is shown an arm 68$^a$ having a guide member 105 secured thereto and in Figure 15 there is shown an arm 76$^a$ having a guide member 106 secured thereto, which may be used in place of the guide wheel 77.

What is claimed is:

1. In an attachment for a tool having a shank and a cutting edge, a guide member for disposal at the front of the cutting edge, the guide member having a rearwardly extending portion, a sleeve mounted on the rearwardly extending portion of the guide member, pin and slot connections between the sides of the sleeve and the rearwardly extending portion of the guide member, the sleeve having a threaded opening at its top, and a screw meshing in the threaded opening for engaging the rearwardly extending portion of the guide member to press the rearwardly extending portion of the guide member against the shank.

2. In an attachment for a tool having a shank and a cutting edge, a guide member for disposal at the cutting edge, a guide member having a rearwardly extending portion, a member having means by which it is normally secured to the shank, and means cooperating with the said two members for moving the first mentioned member relatively to the second mentioned member and longitudinally of the shank.

3. In an attachment for a tool having a shank and a cutting edge, a guide member for disposal at the cutting edge, the guide member having a rearwardly extending portion, a member, means for securing the second mentioned member to the shank, a sleeve mounted on the rearwardly extending portion of the guide member and secured thereto for normally embracing the shank, and means for moving the guide member relatively to the second mentioned member and longitudinally of the shank.

4. In an attachment for a tool having a shank and a cutting edge, a guide member for disposal at the cutting edge, the guide member having a rearwardly extending portion, a sleeve adapted to embrace the shank and having a bearing movable relatively to the sleeve, means for holding the bearing relatively to the sleeve, the bearing having a threaded opening, and a screw meshing in the threaded opening and engaging the rearwardly extending portion of the guide member for adjusting the latter.

5. In an attachment for a tool having a shank and a cutting edge, a guide member for disposal at the cutting edge, a guide member having a rearwardly extending portion, a sleeve adapted to embrace the shank and having a bearing movable relatively to the sleeve, means for holding the bearing relatively to the sleeve, the bearing having a threaded opening, a screw meshing in the threaded opening and engaging the rearwardly extending portion of the guide member for adjusting the latter, a second sleeve secured to the rearwardly extending portion of the guide member and adapted to embrace the shank, and means for securing the second mentioned sleeve relatively to the shank.

6. In an attachment for a tool having a shank and a cutting edge, a guide member for disposal at the cutting edge, the guide member having a rearwardly extending portion, a sleeve adapted to embrace the shank and having a movable bearing, means for holding the bearing relatively to the sleeve, the bearing having a threaded opening, a screw meshing in the threaded opening and engaging the rearwardly extending portion of the guide member for adjusting the latter, a second sleeve movably mounted on the rearwardly extending portion of the guide member, the second mentioned sleeve having a threaded opening, and a screw meshing in the threaded opening in the second mentioned sleeve for engaging the rearwardly extending portion of the guide member for pressing the latter against the shank.

7. In an attachment for a tool having a cutting edge, a guide member disposed in advance of the cutting edge for engaging the material to be cut and having a support, means for securing the guide member to the tool, and a side cutter adjustably mounted on the support and disposed in advance of the cutting edge.

8. In an attachment for a tool having a cutting edge, a guide member disposed in advance of the cutting edge for engaging the material to be cut, means for securing the guide member to the tool, a side cutter, means for securing the side cutter to the guide member, and means for cooperating with the second mentioned means and the side cutter for adjusting the latter relatively to the guide member.

9. In an attachment for a tool having a cutting edge, a guide member disposed in advance of the cutting edge for engaging the material to be cut, means for securing the guide member to the tool, a side cutter having a flange, means for securing the side cutter to the guide member, and means for cooperating with the second mentioned means and the flange for adjusting the side cutter relatively to the guide member.

10. In an attachment for a tool having a cutting edge, a guide member disposed in advance of the cutting edge for engaging the material to be cut, means for securing the guide member to the tool, a side cutter having a flange with an opening, means for securing the side cutter to the guide member, a screw disposed at the second mentioned means and the flange, and means for cooperating with the screw for moving the flange and the side cutter relatively to the second mentioned means with the rotation of the screw.

11. In an attachment for a tool having a cutting edge, a guide member disposed in advance of the cutting edge for engaging the material to be cut, means for securing the guide member to the tool, a bar, means for securing the bar intermediate of its ends to the guide member, guide elements secured to the ends of the bar, and a boss on the bar for engaging a surface of the guide member to assist in the adjustment of the guide bar on its reversal on the guide member.

12. In an attachment for a tool having a shank and a cutting edge, a guide member having a horizontal portion and a side depending therefrom the shank being normally disposed against the horizontal portion and the side of the guide member, means for pressing the shank laterally against the side of the guide member, and means for adjusting the guide member longitudinally of the shank.

13. In an attachment for a tool having a shank and a cutting edge, a guide member having a horizontal portion and a side depending therefrom the shank being normally disposed against the horizontal portion and the side of the guide member, means for pressing the shank laterally against the side of the guide member, a second member, means for securing the second member to the shank, and means cooperating with the second member and the guide member for moving the latter relatively to the shank.

14. In an attachment for a tool having a shank and a cutting edge, a guide member having an opening in which the shank is normally disposed, means for pressing the shank laterally against the guide member, a second member, means for securing the second member to the shank, means cooperating with the second member and the guide member for moving the latter relatively to the shank, a side cutter having cutting edges at its bottom and a top, the top extending beyond the cutting edges at the bottom, a guide having a bottom with its sides normally in alignment with the cutting edges of the side cutter, the guide having a top extending beyond a side of its bottom, and means for securing the side cutter and the guide to the guide member.

15. In an attachment for a tool having a shank and a beveled cutting edge, a guide member normally disposed at the front of the cutting edge and having a straight transverse surface substantially the same width as the cutting edge for contacting at all times with the surface of the material which is to be cut to limit the depth of every cut throughout its length made by the cutting edge, the guide member having a rearwardly extending portion disposed above the shank of the tool with the bottom of the shank of the tool adjacent the cutting edge exposed to permit the tool to pivot at its cutting edge on the material which is to be cut, with the movement of the shank of the tool in one direction limited by the guide member to regulate the depth of the cut made by the cutting edge, the bevel on the tool serving as the sole means to regulate the action of the cutting edge on the surface of the material when the shank of the tool is moved in the opposite direction, and means to secure the rear of the extending portion of the guide member to the rear of the shank.

16. In an attachment for a tool having a shank and a cutting edge, a guide member for disposal at the front of the cutting edge, the guide member having a rearwardly extending portion normally disposed against the upper surface of the shank, a sleeve on the rearwardly extending portion in which the shank is normally disposed, a pin and slot connection between the sleeve and the rearwardly extending portion of the guide member with the slot extending vertically to permit of the vertical movement of the sleeve against the shank, and means to secure the sleeve upwardly against the shank.

17. In an attachment for a tool having a shank with a handle at one end and a cutting edge at the other end, the underside of the shank adjacent the cutting edge being exposed, a guide member disposed in advance of the cutting edge and having a transverse flat surface for engaging the material to be cut throughout each cutting stroke, means for securing the guide member to the tool, and a side cutter adjustably secured to the guide member.

18. In an attachment for a tool having a shank with a handle at one end and a cutting edge at the other end, the underside of the shank adjacent the cutting edge being exposed, a side cutter disposed in advance of the cutting edge, a guide member disposed between the cutting edge and the side cutter for engaging the material to be cut, means for securing the guide member to the tool, and means for securing the side cutter to the guide member.

19. In an attachment for a tool having a shank with a handle at one end and a cutting edge at the other end, the underside of the shank adjacent the cutting edge being exposed, a side cutter disposed in advance of the cutting edge, a guide member disposed between the cutting edge and the side cutter for engaging the material to be cut, means for securing the guide member to the tool, and means for adjustably securing the side cutter to the guide member.

20. In an attachment for a tool having a shank with a handle at one end and a cutting edge at the other end, the underside of the shank adjacent the cutting edge being exposed, a guide member disposed in advance of the cutting edge and having a transverse flat surface for engaging the material to be cut, means for securing the guide member to the tool, a bar, means for securing the bar to the guide member, and one or more guide elements secured to the bar for cooperating with the said surface to regulate the cutting action of the cutting edge.

21. In an attachment for a tool having a shank with a handle at one end and a cutting edge at the other end, the underside of the shank adjacent the cutting edge being exposed, a guide member disposed in advance of the cutting edge and having a transverse flat surface for engaging at all times the material to be cut, means for securing the guide member to the tool, a bar disposed transversely of the guide member, means for securing the bar to the guide member, a guide element or elements secured to the bar, and a side cutter secured to the guide member with the said surface of the guide member disposed between the side cutter and the cutting edge.

22. In an attachment for a tool having a shank with a handle at one end and a cutting edge at the other end, the underside of the shank adjacent the cutting edge being exposed, a guide member disposed in advance of the cutting edge and having a transverse flat surface engaging the material to be cut at all times in the use of the attachment, means for securing the guide member to the tool, a bar disposed transversely of the guide member, means for securing the bar to the guide member, one or more guide elements secured to the bar, a side cutter secured to the guide member with the said surface of the guide member disposed between the side cutter and the said cutting edge, a member, means for securing the second mentioned member to the shank, and means cooperating with the second mentioned member and the guide member to adjust the position of the guide member longitudinally of the shank.

23. In an attachment for a tool having a shank with a handle at one end and a cutting edge at the other end, the underside of the shank adjacent the cutting edge being exposed, a guide member disposed in advance of the cutting edge and having a transverse flat surface for engaging the material to be cut throughout each cutting stroke, and means for securing the guide member to the tool.

GEORGE E. SHOWERS.